Dec. 24, 1957 K. L. BELL 2,817,785

VACUUM TUBE AND ELECTRIC SIGNALLING APPARATUS

Filed March 3, 1950 3 Sheets-Sheet 1

INVENTOR.
KEITH L. BELL

BY

Ben. J. Chromy
his ATTORNEY.

VACUUM TUBE AND ELECTRIC SIGNALLING APPARATUS

Filed March 3, 1950 3 Sheets-Sheet 2

INVENTOR.
KEITH L. BELL

BY
Ben J. Chromy
his ATTORNEY

Dec. 24, 1957 K. L. BELL 2,817,785

VACUUM TUBE AND ELECTRIC SIGNALLING APPARATUS

Filed March 3, 1950 3 Sheets-Sheet 3

INVENTOR.
KEITH L. BELL

BY Ben. J. Chromy
his ATTORNEY

United States Patent Office 2,817,785

Patented Dec. 24, 1957

2,817,785

VACUUM TUBE AND ELECTRIC SIGNALLING APPARATUS

Keith Lansing Bell, Washington, D. C., assignor of one-half to Ben. J. Chromy, Washington, D. C., and fifteen percent to Herbert J. A. Runsdorf and H. Norman Runsdorf, both of Brooklyn, N. Y.

Application March 3, 1950, Serial No. 147,532

9 Claims. (Cl. 315—10)

My invention relates to electron discharge devices in general. More specifically this invention relates to an electron discharge device which may be used as a television camera that is responsive to light of different colors or frequencies and is self scanning for proper image resolution.

An object of this invention is to provide an improved electron discharge device that may be employed as a television camera, an oscillation generator or a frequency multiplier.

Another object of this invention is to provide a frequency multiplier adapted to produce oscillations having wavelengths on the order of a millimeter or less.

Another object of my invention is to provide a television image transmitting camera which is self scanning, self rastering or self image dissecting.

Another object of my invention is to provide an improved type of television image transmitting camera which may be either panchromatic or monochromatic in its response to light of different colors or frequencies dependent upon the photo electric materials employed and acts to release groups, pulses or waves of electrons from a light sensitive electron emissive element adapted to modulate a radio frequency carrier wave of usual type or adapted to be impressed upon other carrier means.

Another object of my invention is to provide a television image transmitting camera that transmits action scenes with frames per second frequency so low that the signal may be efficiently transmitted over conventional telephone cables or wires or world wide on the radio waves of relatively long wave lengths.

A further object of my invention is to provide a self scanning camera capable of transmitting by television on a low frequency carrier of, for example, 300 kc. from one to thirty or more complete pictures or frames per second.

Still a further object of my invention is to provide a self scanning television camera that employs non interlacing electron waves impinging against an angularly tilted collector, the tilted collector, target or anode.

Still another object of my invention is to provide a self image dissecting television camera which transmits picture or image signals together with sound signals.

A still further object of my invention is to provide a television camera which will instantaneously and continuously transmit complete self scanned or self dissected pictures or frames of an image formed by lights of different colors and intensities on the light sensitive electron emissive cathode at very high speed.

Still another object of my invention is to provide a magnetic field positioned in such angular relationship to the electrons which are released at different energies from the light sensitive electron emissive cathode of the television camera by light of different intensities, colors or frequencies impinging upon the light sensitive cathode, that the released electrons then travel between the cathode and the electron collector, target or anode in curved paths depending upon their energies.

Another object of this invention is to provide a frequency multiplier employing an electron discharge device with an electron collector positioned askew with respect to the cathode and provided with a discontinuous electron collecting surface that is connected to provide multiplied pulses in an output circuit.

Still another object of this invention is to provide a frequency multiplier employing an electron discharge device that is connected to generate electrical oscillations and at the same time multiplies the frequency of those oscillations on the order of a thousand times.

A further object of this invention is to provide an electron discharge device having a flat electron emitting cathode and a cone shaped electron collecting electrode provided with a spiral shaped electrically conducting surface.

Another object of this invention is to provide an electron discharge device having flat electron emitting cathode and a trapezoidal electron collecting electrode positioned askew with respect to the plane of the cathode.

Other and further objects and applications of my invention will be readily apparent to those skilled in the art and are to be considered within the scope of my invention and my appended claims.

Referring to the drawings briefly:

Figure 1:
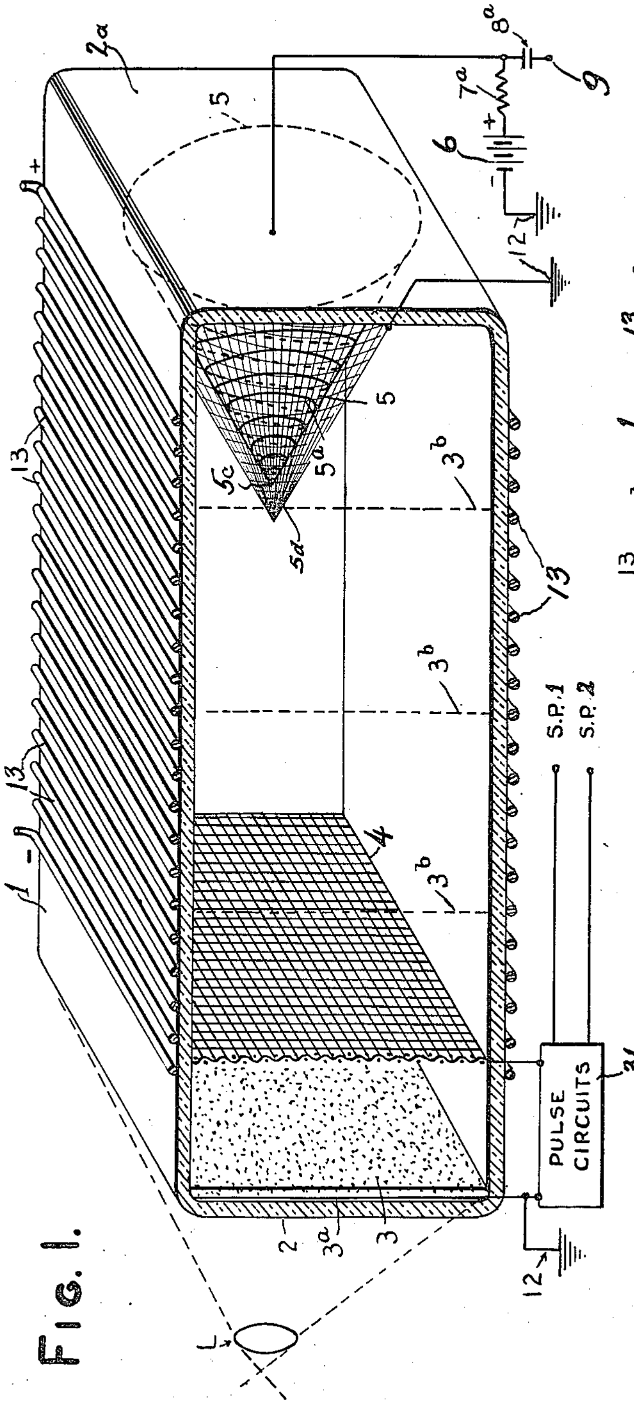
Fig. 1 is a cross sectional axial view of an embodiment of this invention.

Referring to Fig. 1 of the drawing in detail. Reference numeral 1 designates a transparent glass or other suitable envelope enclosing a plurality of electrodes in the evacuated space or vacuum thereof. The transparent frontal face 2 of envelope 1 is arranged to support a light sensitive electron emissive layer 3 and the transparent electrically conductive layer 3*a*. The layer 3 may be composed of different kinds of light sensitive salts of elements, such as potassium, sodium and cesium to form a composite photoelectric cathode having a panchromatic response to light of different colors. This light sensitive elemental layer 3 is deposited upon or attached to the transparent electrically conductive layer 3*a* which may be annealed stannous chloride or a thin layer of gold or silver deposited on a plastic sheet such as "Markite" by cathode sputtering, evaporation in a vacuum or other well known processes for applying very thin metallic coatings.

A wire mesh screen 4 is employed as a control grid and the mesh or interstices per square inch of this grid determines the number of picture elements which can be transmitted per frame. For example, a 100 mesh or interstice per linear inch screen or grid 4 may be used to produce 10,000 mesh or interstices per square inch thereby producing a picture of 10,000 elements per square inch comparable in detail to a 100 mesh screen half tone newsprint.

The target electrode 5 consists of a metal cone which may be either solid or hollow and may have an angle of substantially 45 degrees in its apex. This electrode 5 is attached to the inner face of end wall 2*a* of envelope 1 in such fashion that the apex of the cone points toward the centers of grid 4 and cathode 3. The external conical surface of the electrode 5 is provided with a single continuous very narrow spiraling groove filled with an electrically insulating material and extending from the apex to the base of the cone and each spiral groove 5*a* which may be filled with insulating material or if it is of sufficient depth it may be left open. The thickness of this groove may be on the order of $\frac{1}{100}$ of an inch, the example, and the purpose of this groove is to divide the surface of the cone 5 into a single continuous spiral shaped electrode.

Figure 2:
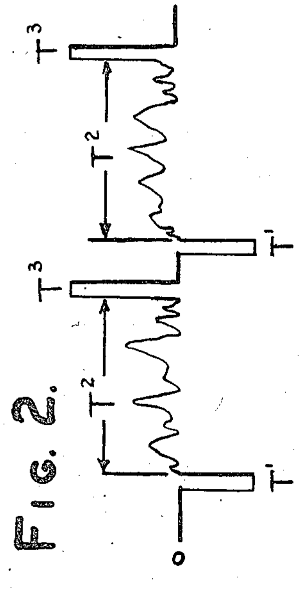
Fig. 2 is an illustration of the output wave form.

The electrode 5 is connected to the positive terminal of the battery power supply 6 through the resistor 7*a* and the output electrical pulses may be taken off the anode 5 through coupling capacitor 8*a* at the terminal 9. The negative terminal of the battery 6 is connected to ground return or chassis. A source of direct current (not shown) is also connected to the wire coil 13 wound axially and externally around envelope 1 to focus and hold the individual electrons emitted by the photoelectric cathode 3 and constituting a wave, sheet or pulse of electrons designated by one of the lines 3*b*, in predetermined positional relation while this wave, sheet or pulse of electrons travels or progresses from the cathode 3 through the control grid 4 to the self scanning electron collector anode 5 in order to maintain picture detail and eliminate distortion. The dotted lines 3*b* designate substantially parallel sheets of electrons which represent an image focussed on the photo cathode 3. These electron sheets 3*b* are triggered through control grid 4 by suitable pulse circuits well known in the electric signalling art and designated as pulse circuits 31. These pulse circuits supply the positive pulse T′ (Fig. 2) that is applied to the grid 4 with respect to the cathode 3 to gate the sheets or waves 3*b* of electrons, and they also supply this same pulse T′ for transmission to the television receiver to start the spiral scan at this receiver. This spiral scan is stopped by the negative pulse $T^3$ which is also transmitted to the television receiver.

In operation the pulse circuit 31 connected between the cathode conductive layer 3*a* and the grid 4, as shown in Fig. 1, permit waves or groups 3*b* of electrons to pass through the grid 4 to the anode 5 each time a positive pulse is applied to this grid with respect to the cathode. These waves of electrons are focussed by the focussing coil 13 and are drawn to the conical anode 5 which is maintained at a positive potential with respect to the cathode by the battery 6. As these waves of electrons proceed to the anode 5 the central part of the electron wave impinges upon the apex 5*c* of the cone 5 and produces current impulses corresponding to the left hand part of the wave $T^2$ shown in Fig. 2, in the output circuit 9 of the tube. As the electron wave proceeds further to the anode 5 so that the whole wave engulfs this electrode, the complete pulse series $T^2$ is transmitted to the output circuit of the tube and this complete pulse series corresponds to the light intensities on the cathode 3 starting in the center of this cathode and proceeding in a spiral to the sides of the cathode. Thus in order to utilize the pulse series $T^2$ in reception it is necessary to provide the receiving apparatus cathode ray viewing tube with a spiral scan which starts scanning at the center of the viewing tube screen and spirals to the sides of this screen. The starting of this spiral scanning may be initiated by the positive pulse $T^1$ and the scanning may be stopped by the pulse $T^3$.

In order to reduce or eliminate any distorting action that may be caused by the current flow in the anode 5 on the electron waves approaching this anode, a screen electrode 5*d* which is also of conical shape and which may be connected to be at any desired potential with respect to the anode or cathode, or which may be at ground potential, as shown may be positioned a short distance ahead of the anode 5 so that the electron waves will have to pass through this screen electrode before impinging upon the anode 5.

Furthermore, the anode 5 may be made of greatly reduced size compared to the size of the cathode so that the size of this anode as illustrated in Fig. 1 may be greatly exaggerated. For this purpose the electron waves 3*b* proceeding from the cathode would, of course, be focussed so that these waves would be gradually compressed as they proceed from the cathode 3 to the anode 5. In this case the anode 5 of reduced size may be positioned at the point 5*c* shown in Fig. 1 and in other respects the design of the anode would remain the same as that illustrated in Fig. 1. However, in the case of the anode of reduced size, the electrons from the central portion of the cathode 3 would still impinge upon the apex of the anode 5 first and the remainder of the cathode would be scanned in spiral fashion as before.

As described above, Fig. 2 represents the output wave form of the apparatus shown in Fig. 1. The line designated O is the no signal reference line, T′ are the scanning start pulses, $T^2$ are the image pulses and $T^3$ are the stop scan or retrace pulses. The point S. P. 1 is the takeoff for the spiral scan start pulses and S. P. 2 is the takeoff point for the blanking retrace or stop pulses.

Figure 3:
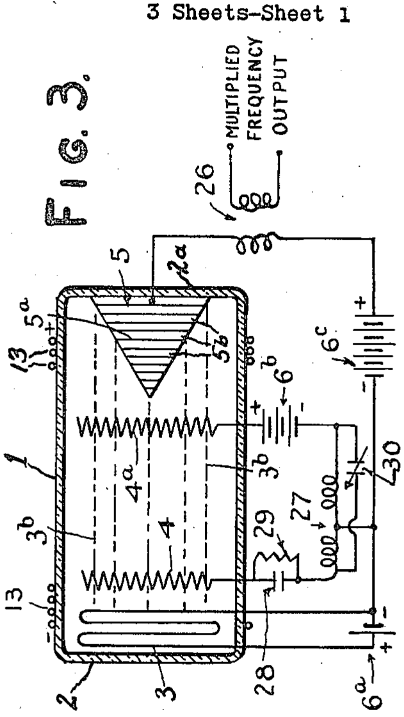
Fig. 3 is a cross sectional view of another embodiment of my invention used as a frequency multiplier.

In Fig. 3 there is illustrated an embodiment of my invention employed as an oscillation generator and frequency multiplier of the initially generated oscillation frequency. Like reference numerals in this figure designate corresponding parts as shown in Fig. 1. An evacuated glass envelope 1 elongated and rectangular in shape is here also employed to enclose a plurality of electrode elements in high vacuum. The opposite end walls 2 and 2*a* of the envelope 1 are respectively the cathode end and the anode end, the thermionic electron emissive incandescent filament or cathode 3 being near the end 2 and the conical anode 5 being supported on the inside of the end 2*a*. The control grid 4 and the grid-like anode 4*a* are positioned between the cathode 3 and the anode 5. Feedback is provided for the oscillating control grid 4 and center tapped coil 27 is connected between the electrodes 3, 4 and 4*a* to function as a conventional Hartley oscillator.

The metal cone 5 attached to end wall 2*a* has a plurality of individual and separate concentric, parallel grooves 5*a* cut into metal cone 5. These grooves may be filled with an electrically insulating material so that the electrically conductive exposed metal surfaces of metal cone 5 is divided to provide a plurality of concentric electrically conductive rings 5*b* separated by insulating rings 5*a*. The metal cone 5 has an angle in its apex of substantially 45 degrees or other suitable angle.

The filament current supply battery 6*a* is connected to heat the filament or cathode 3 either directly or indirectly as is well known in the vacuum tube art. The first anode 4*a* is supplied with current from the battery 6*b* and the current supply battery 6*c* is connected to the conical anode 5 through the primary of output transformer 26. The secondary of transformer 26 is inductively coupled to the primary thereof and the multiplied frequency taken from this secondary.

The control grid by-pass capacitor 28 and grid leak resistor 29 are connected between one end of the Hartley coil 27 and the grid electrode 4. A variable tuning capacitor 30 is shunted across the ends of the oscillator coil 27 and is employed to vary or tune frequency of the initially generated electrical oscillations, the frequency of which will be multiplied by a number equal to the number of concentric conductive rings 5*b* in metal cone anode 5.

A coil of wire 13 is wound around the outside of the envelope 1 and functions as a solenoid to focus the electrons. This coil is energized by direct current from a source (not shown) and is employed to hold the electron in a stream or beam in their flight from thermionic cathode 3.

The operation of Fig. 3 is as follows. A high frequency modulated electron beam 3*b*, produced by the action of the Hartley oscillator as previously described. This beam passes on to the conical anode 5 and each electron pulse corresponding to an oscillation in the electron beam engulfs the segments 5b of the anode 5 thereby producing a series of individual current pulses corresponding in number to the number of these segments 5b, from each electron oscillation pulse. This series of current pulses passes to the output circuit 26. While this output circuit has been shown as a transformer it is obvious that the anode 5 may be coupled to an ultra high frequency circuit such as a wave guide by connecting this anode to a suitable probe or antenna member in the wave guide. The positive terminal of the battery 6c would in this case be connected to the anode through a suitable impedance or choke to prevent the ultra high frequency from passing into the battery.

Figure 6:
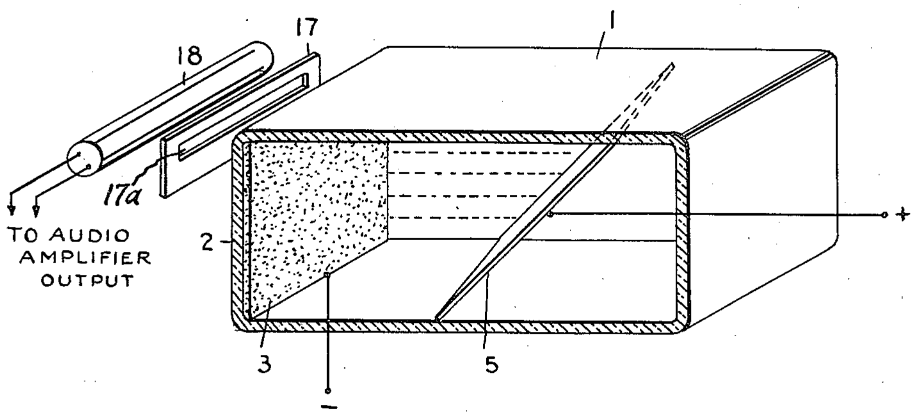
Fig. 6 is a view of another embodiment of this invention.

Furthermore, the grooves 5a of the anode 5 may be made of substantial width comparable to the width of the segments 5b and this anode may also be made of the shape and positioned as shown in Fig. 6, in which case the face of the anode would, of course, also be provided with grooves 5a filled with insulation material.

Figure 4:
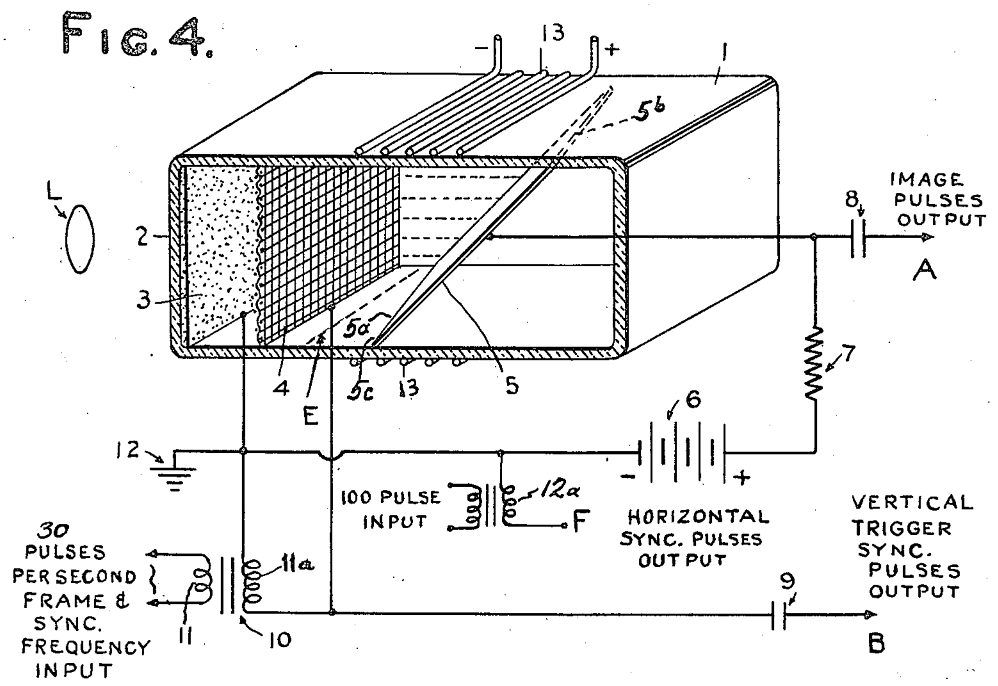
Fig. 4 is a cross sectional view of another embodiment of this invention employing a target electrode positioned askew with respect to the plane of the cathode.

In Fig. 4 there is illustrated a further modified form of this invention. It should be particularly noted that electrically conductive electrode 5, which may be a thin metal plate is employed as an electron collector, target or anode and is permanently positioned in a specific dual angular relationship in the vertical and horizontal planes with respect to the cathode 3, which is provided with either a panchromatic of a monochromatic light sensitive electron emissive surface. The electrode 4 which is an electrically conductive wire screen of very fine mesh, on the order of 10,000 mesh per square inch, is positioned parallel to the electron emissive cathode 3. It is of course obvious that different mesh screens for different degrees of picture detail may be used as desired in order to control the waves of electrons passed on to the tilted collector 5.

A transformer 10, having primary and secondary coils 11 and 11a wound in inductively coupled relation, is connected to a source of alternating current providing the frame and synchronizing frequency. One side of the secondary coil 11a is connected to photoelectric cathode 3, to ground 12, to one side of the pulse transformer secondary 12a and to the negative terminal of the anode battery 6; and the other side of this secondary 11a is connected to the control electrode 4 and is coupled by the capacitor 9 to the output B.

In the arrangement of this device shown in Fig. 4 no two points of the electrode 5, which because of its angular position is of an area or distance equal to that of the plane of cathode 3, no two points of anode 5 are the same distance away from the cathode 3 excepting a minute diagonal plane. The bottom edge 5a of the electrode 5 is positioned at a 45 degree or other suitable angle with respect to the bottom edge of the cathode 3 and the edge 5b is inclined at a greater angle with respect to the top edge of the cathode. The plane of the collector electrode 5 forms a trapezoidal figure no two points of which are the same distance from the electron emitting plane of the cathode 3. Therefore, when a cloud E of electrons representing an image to be transmitted by television, is released by light from the cathode 3 and this electron cloud is gated through the control electrode 4 by a positive electrical pulse from an external source being momentarily impressed on electrode 4 the electron cloud from cathode 3 will pass through the control electrode 4 at uniform velocity. Thus all the electrons of the electron cloud from member 3 move towards collector 5 at substantially the same velocity and in the same vertical plane in respect to each other, therefore the electron cloud will strike the collector 5 at the point 5b nearest to the cathode 3 first and henceforth will continue to strike the progressively further points of the collector 5 consecutively and progressively until the entire surface of collector 5 has collected the electron cloud constituting a complete electron image from the cathode 3 characteristic of and corresponding to the visible light image focusses thereon.

It is to be noted that metal plate electron collecting anode 5 must be perfectly flat to 1/10000 of an inch and smooth on the side facing cathode 3 and control grid 4 and is positioned at a minute oblique horizontal angle calibrated to very close tolerances. The progressively increasing oblique horizontal angle of anode 5 and the progressively increasing vertical angle are so calibrated that no more than one specific point of the electron cloud E representing the image from photo cathode 3 triggered by the positive pulse applied to the grid 4 with resect to the cathode 3, can strike more than one specific point of anode 5 at a given instant. The electrons of this cloud must strike the anode 5 in a consecutive horizontal linear order progressively from one side to the other and rising vertically from bottom to top of anode 5 until the total area of the flat side of anode 5 facing toward photo cathode 3 has been completely covered or scanned by the electron cloud from photo cathode 3 which represents the image to be transmitted by television.

Figure 5:
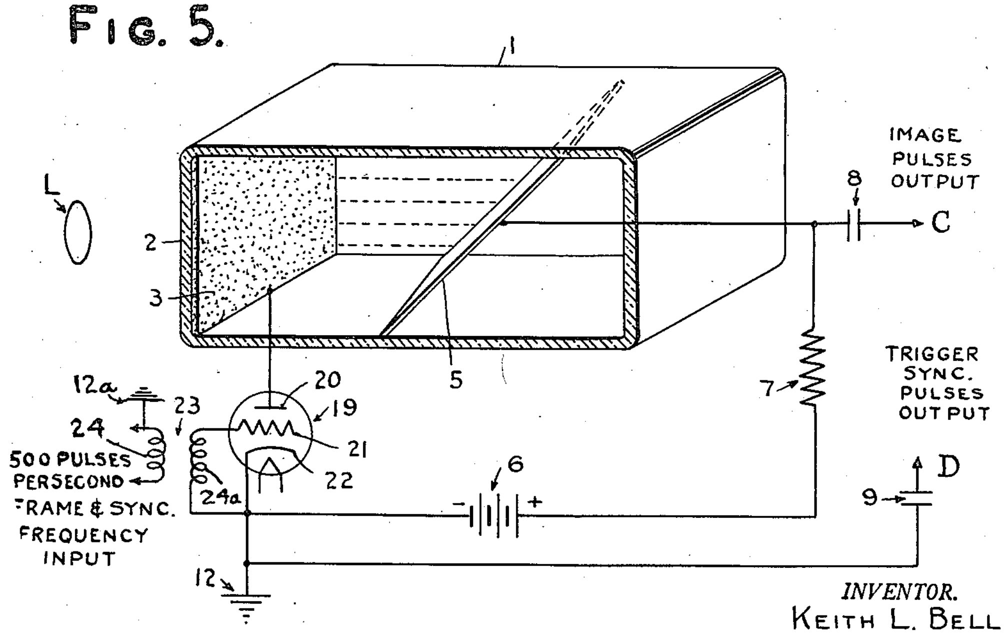
Fig. 5 is a modified form of this invention shown in Fig. 4 in which the control grid has been eliminated.

In Fig. 5 there is shown a modified form of this invention in which the grid 4 has been eliminated from the tube 1. The tube 1 in this form of the invention is also provided with a cathode 3 at the front end 2 of the tube and a lens L is employed for focussing an image on this light sensitive cathode through the end 2 and the tube 1 the same as in the embodiments of this invention shown in Figs. 1 and 4. The tube 1 shown in Fig. 5 is also provided with an anode 5 which is of trapezoidal shape the same as the anode shown in Fig. 4 and the electrons emitted by the cathode 3 are focussed upon the anode 5 by the focussing coil the same as the coil 13 shown in Fig. 4.

It is possible to dispense with the control grid 4 shown in Fig. 4, in the form of this invention shown in Fig. 5, by providing a pulsing or triggering tube 19 having an anode 20, connected to the cathode 3, a control grid 21 connected to the secondary 24a of the input transformer 23 and also having a cathode 22 connected to the lower end of the secondary 24a. This cathode 22 is also connected to ground 12 and to the negative terminal of the anode battery 6, the positive terminal of which is connected to the anode 5 and to the resistor 7. The output circuit carrying the image pulses is coupled to the anode 5 by the capacitor 8 and the output circuit carrying the trigger pulses for carrying the synchronizing pulses to be transmitted to the receiver is connected to the cathode of the tube 19 by the capacitor 9. It is obvious that these latter pulses may be obtained from the anode 20 of the tube 19, if desired.

The pulses controlling the tube 19 are applied to the input of this tube through the transformer 23 and for this purpose a suitable pulse generating circuit such as a multi vibrator may be connected to the primary 24. On the other hand the input of the tube 19 may be coupled directly or through a suitable capacitor to the output of a pulse generator of any desirable and conventional design. Thus the internal impedance of the tube 19 is periodically reduced at the frequency of the pulses applied to this tube and pulses or clouds of electrons are periodically caused to pass between the cathode 3 and the anode 5. These pulses or clouds of electrons are collected on the anode 5 and produce a pulse of much longer duration than the duration of the initial triggering pulse. However, the initial energy or potential applied to the electrons to cause them to move toward the anode 5 is furnished by the pulse applied between the cathode 3 and the anode 5 by the operation of the tube 19. If desired, a suitable high resistance may be connected from the anode 20 of the tube 19 to the anode 5 of the tube 1 and the potential drop across this resistor due to the pulse transmitted through the tube 19 may be employed to trigger the tube 1. Furthermore, the tube 19 may be a gas tube of the thyratron type and in that case the resistor connected between the anode 20 and the anode 5 and the resistor 7 may be so proportional as to function as a quenching resistor for the gas tube 19.

In Fig. 6 there is shown a modification of this invention in which the upper part of the cathode 3 is exposed to light from a tube or lamp 18 which is modulated in accordance with sound waves or in accordance with other signals of varying amplitude. The tube 18 is of elongated shape and is provided with a pair of electrodes positioned in parallel relation and extending substantially throughout the length of the tube. Thus voltages modulated in accordance with sound waves or other amplitude modulated signals will cause the gas in the tube 18 to be ionized different degrees along the length of this tube, starting at the left hand end and proceeding to the right hand end. In this way a relatively low voltage signal will ionize the gas at the left hand end of the tube only whereas a relatively high voltage signal will ionize the gas throughout the length of the tube. The light from the ionized gas passes to the cathode 3 through the slot 17*a* formed in the mask 17 or through a suitable lens and electron emission is produced on the part of the cathode 3 that is thus activated. A picture image may be projected on the lower part of the cathode 3 or other modulated signal derived from a series of tubes such as tube 18 may be used to energize the balance of the cathode 3. This embodiment is employed for the simultaneous transmission of single channel sight and sound. Obviously the television receiver employed for receiving the simultaneous sight and sound transmitted by the embodiment of Fig. 6 would require a photo electric cell positioned at a point on the face of the receiving picture kinescope in exact registration where the flashing light image of gaseous glow tube 18 would appear and this photo cell is connected to a suitable amplifier and the output thereof connected to a suitable audio transducer.

Figure 7:
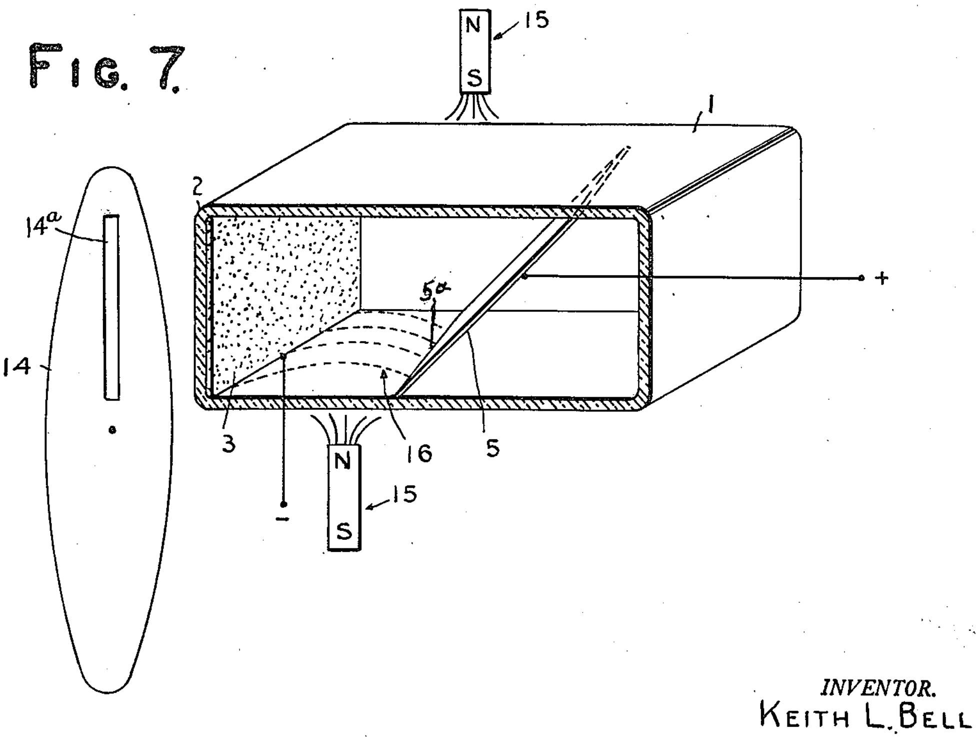
Fig. 7 is a view of a further embodiment of this invention.

In Fig. 7 there is shown another embodiment of this invention in which the tube 1 is provided with an electron emissive cathode 3 that is supported on the front 2 of the tube. The target electrode 5 is similar to the target electrode shown in Figs. 4, 5 and 6 except that in this case this electrode may be tilted at a greater angle and may, in fact, lie flat on the bottom side of the tube. However, the front edge 5*a* of this electrode is positioned at an angle with respect to the plane of the cathode 3. In addition to the electron focussing winding 13, similar to the winding 13 shown in Fig. 4, the tube 1 shown in Fig. 7 is provided with a pair of permanent magnets or solenoids 15 which are of such size and oriented so that the paths 16 of the electrons emitted by the cathode 3 are curved to hit the corresponding areas of the target 5.

A thin disc 14 that is opaque to light and is provided with a narrow slotted aperature 14*a* is employed as a rotary focal plane shutter to control the number of complete pictures or frames transmitted per second depending upon the revolutions of this disc. This disc may be driven by any suitable means, as shown. In addition to the slot 14*a* two more slots may be provided to this disc and these slots may be disposed at angles of 120 degrees from each other. Furthermore, the different slots may be provided with different color filters, that is, one slot may carry a red filter, the second slot may carry a green filter and the third slot may carry a blue filter and these may be employed for synchronized sequential transmission of television images in natural color.

When employing a control grid 4, shown in Figs. 1 and 4, of 10,000 mesh per square inch and pulsing it positive 30 times a second for 30 complete frames or pictures per second of 10,000 elements per square inch for each frame or picture it will be seen that $10{,}000 \times 30 = 300{,}000$ pulses per second assuming a total one square inch of photo cathode 3 were illuminated by light of different intensity, therefore it is obvious that to employ mg. invention pictures in detail comparable to a 100 mesh half tone print could be dissected, self scanned and transmitted by television on a 300 kilocycle channel making possible direct world wide television completely eliminating horizon to horizon line of sight barriers, co-axial cable and radio relays as conventional present day television now demands and employs for distance transmission.

The camera of this invention may be used to advantage in guided missile television where lightness, compactness and economy is demanded and offers beyond the horizon television transmission on low frequencies.

While this invention has been disclosed in detail with respect to certain preferred embodiments, it is, of course, understood that it is not desired to limit this invention to the exact details shown and described except in so far as those details are defined by the appended claims.

I claim as follows:

1. Electric signalling apparatus comprising a tube having a substantially flat photo sensitive cathode, means for projecting an image on said cathode, a target electrode, a flat grid electrode coextensive with and positioned parallel to said cathode, means connected between said cathode and said grid electrode for projecting a wave of electrons from all of the elemental areas of said cathode toward corresponding areas of said target electrode, said cathode and said target electrode being angularly disposed with respect to each other that said wave of electrons reaches different elemental areas of said target at different times and each wave reaches substantially the whole area of said target.

2. Electric signalling apparatus comprising a tube having a flat photo emissive cathode, a target electrode, means for projecting an image on said cathode, means for focussing the electron stream from said cathode upon said target electrode, a flat grid electrode coextensive with and positioned parallel to said flat cathode means connected between said cathode and said grid electrode for gating said electron stream to divide it into pulses of predetermined time duration and means for lengthening the time duration of the voltage pulses obtained from said target electrode corresponding to said electron stream pulses.

3. Electric signalling apparatus comprising a tube having a flat photo emissive cathode, a target electrode, means for projecting an image on said cathode, means for focussing the electron stream from said cathode upon said target electrode, a flat grid electrode coextensive with and positioned parallel to said flat cathode means connected between said cathode and said grid electrode for gating said electron stream to divide it into pulses of predetermined time duration, said cathode and said target electrode being angularly disposed with respect to each other so that different elemental areas of said target electrode are at different distances from said cathode whereby the time duration of the voltage pulses obtained from said target electrode is greater than the duration of the corresponding electron waves.

4. Electric signalling apparatus comprising a tube having a flat photo emissive cathode made up of a plurality of elemental areas, means for projecting an image on said cathode, means for producing a stream of electrons from said cathode, said stream of electrons having a cross section corresponding to the area of said cathode, a grid electrode parallel to said cathode for interrupting said stream to produce waves of electrons, different parts of said waves having electron densities corresponding to light and dark tones of said image and a target electrode for receiving said waves of electrons and an output circuit connected to said target electrode to receive voltage pulses therefrom.

5. Electric signalling apparatus comprising a tube having a flat photo emissive cathode having a plurality of elemental areas, means for projecting an image on said cathode, means for producing a stream of electrons from said cathode, said stream of electrons having a cross section corresponding to the area of said cathode, a grid electrode coextensive with and parallel to said cathode for interrupting said stream to produce waves of electrons, different parts of said waves having electron densities corresponding to light and dark tones of said image and a target electrode disposed at an angle with respect to said cathode for receiving said waves of electrons to produce voltage pulses therefrom, different parts of said target electrode intercepting different parts of each of said electron waves corresponding to different elemental areas of said cathode and an output circuit connected to said target electrode.

6. Electric signalling apparatus comprising a tube having a photo emissive cathode having a plurality of elemental areas, means for projecting an image on said cathode, means for producing a stream of electrons from said cathode, said stream of electrons having a cross section corresponding to the area of said cathode, means for interrupting said stream to produce waves of electrons, different parts of said waves having electron densities corresponding to light and dark tones of said image and a cone shaped target electrode having the apex thereof pointing toward said cathode for receiving said waves of electrons to produce voltage pulses therefrom.

7. Electric signalling apparatus comprising a tube having a photo sensitive cathode, means for projecting an image on said cathode, a cone shaped target electrode having a spiral electrically conductive surface, said cathode and said target electrode being positioned so that corresponding elemental areas thereof are different distances apart, a control electrode positioned between said cathode and said target electrode, a voltage pulse generator connected between said cathode and said control electrode for controlling the flow of electrons between said cathode and said target electrode, means for focussing the electrons from said cathode upon corresponding elemental areas of said target electrode, and an output circuit connected between said cathode and said target electrode.

8. Television apparatus comprising a tube having a substantially flat electron emissive cathode, means for projecting an image on said cathode, a target electrode, said target electrode being formed in the shape of a cone with the apex thereof pointing toward said cathode, a voltage pulse producing generator having an output circuit connected to apply voltage pulses between said cathode and said target electrode, each of said voltage pulses having a time duration on the order of a fraction of a microsecond, and an output circuit connected to said target electrode for deriving pulses therefrom having a substantially greater time duration than that of said first mentioned pulses and being amplitude modulated in accordance with the light and dark tones of said image.

9. Electric discharge apparatus comprising a tube having a cathode of substantially flat configuration, a cone shaped target electrode, said cathode and said target electrode being positioned with respect to each other so that no parts of said cathode and said target electrode are parallel, means for applying voltage pulses between said cathode and said target electrode to produce clouds of electrons traveling from said cathode to said target electrode, said pulses being spaced so that the electrons from one cloud are completely collected by said target electrode before the electrons from the next cloud impinge upon said target electrode, and an output circuit connected to said target electrode for deriving pulses having a duration substantially equal to the duration of said first mentioned pulses plus the spacing therebetween.

References Cited in the file of this patent

UNITED STATES PATENTS

| | | |
|---|---|---|
| 1,738,397 | Schriever | Dec. 3, 1929 |
| 1,898,080 | Culver | Feb. 21, 1933 |
| 2,107,782 | Farnsworth | Feb. 8, 1938 |
| 2,158,853 | Coolidge | May 16, 1939 |
| 2,160,672 | Ploke | May 30, 1939 |
| 2,172,727 | Bruche et al. | Sept. 12, 1939 |
| 2,189,322 | Flory | Feb. 6, 1940 |
| 2,196,278 | Teal | Apr. 9, 1940 |
| 2,227,013 | Schlesinger | Dec. 31, 1940 |
| 2,228,402 | Reichel et al. | Jan. 14, 1941 |
| 2,237,896 | Vance | Apr. 8, 1941 |
| 2,264,630 | Farnsworth | Dec. 2, 1941 |
| 2,301,820 | Schlesinger | Nov. 10, 1942 |
| 2,307,209 | George | Jan. 5, 1943 |
| 2,423,124 | Teal | July 1, 1947 |
| 2,598,612 | Shonnard | May 27, 1952 |